May 17, 1927.  A. M. KLEIN  1,628,850
APPARATUS FOR TREATING FOOD CONTAINING MATERIALS
Original Filed Jan. 2, 1925
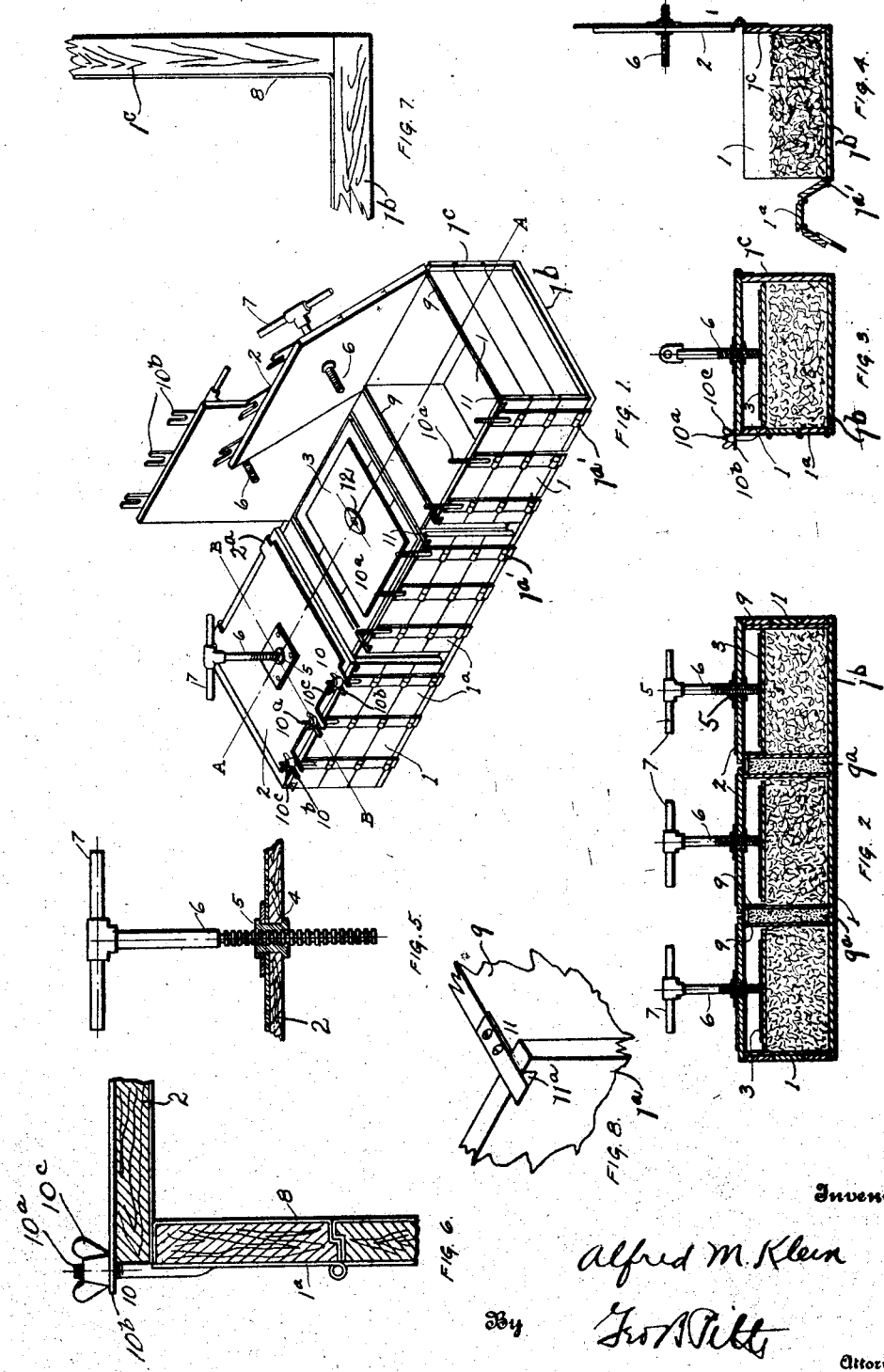
Inventor
Alfred M. Klein
By
Geo. A. Pitt
Attorney Patented May 17, 1927.

1,628,850

UNITED STATES PATENT OFFICE.

ALFRED M. KLEIN, OF WELLINGTON, OHIO, ASSIGNOR, BY MESNE ASSIGNMENTS, TO THE PIERCY COMPANY, OF DOVER, DELAWARE, A CORPORATION OF DELAWARE.

APPARATUS FOR TREATING FOOD-CONTAINING MATERIALS.

Original application filed January 2, 1925, Serial No. 147. Divided and this application filed July 11, 1925. Serial No. 43,038.

This invention relates to apparatus for treating or conditioning various materials into what is generally known as a succulent feed for animals, including cattle, stock and chickens. The apparatus is particularly adapted for use in connection with a certain process or processes of treating or conditioning roughage or waste materials on farms or farm lands, such as corn stalks, corn ears, alfalfa, soy beans, cowpeas, timothy hay, clover hay, sweet clover, sorghum fodder, marsh hay and any other fibrous and cellulose materials which contain food values including proteins and carbohydrates, and also other materials, for example grains, such as corn, oats, wheat and rye and the like.

Any one or any two or more of these materials may be treated either separately or together, the apparatus lending itself for treatment of all leguminous and non-leguminous materials of this sort irrespective of the kind or character and whether they are mixed or not.

One object of the invention is to provide an improved apparatus for treating materials of the above character, whereby the same may be uniformly and readily subjected to moisture and a suitable converter to effect chemical re-action and the generation of heat and the conversion of the materials into suitable condition for consumption purposes.

Another object of my invention is to provide an improved apparatus that is relatively simple, easily manufactured and readily operated.

Other objects of the invention will be apparent to those skilled in the art to which my invention relates from the following description taken in connection with the accompanying drawing, wherein—

Fig. 1 is a perspective view of an apparatus embodying my invention, showing a plurality of containers for treating three separate batches of materials.

Fig. 2 is a longitudinal sectional view on the line A—A of Fig. 1.

Fig. 3 is a transverse section on the line B—B of Fig. 1.

Fig. 4 is a section similar to Fig. 3, but showing its top raised and front wall opened.

Fig. 5 is a section (enlarged) on the line 5—5 of Fig. 2.

Figs. 6 and 7 are fragmentary detail views.

Fig. 8 is a fragmentary perspective view.

The apparatus herein disclosed is particularly adapted for use in connection with my process, disclosed in my co-pending application Ser. No. 147, of which this application is a division. I prefer to use a suitable container of a size sufficient to treat a batch of material equal to the amount that is to be utilized in each feeding of the animals or stock to be fed. For convenience and to facilitate the treating of the material so that it may be utilized at the end of the treatment or within a short time thereafter, I prefer, in the application of my invention in actual use, to provide three or more containers, depending upon the amount of feed to be produced. That is, I prefer to make three batches of materials for the three daily feedings and I may use one container for each feeding or two or more containers depending on the quantity to be used. In illustrating and describing my invention, I have shown a unitary casing or cabinet containing three compartments 1, each of a size to hold substantially a ton of material, but each of these containers may have a larger or smaller capacity as conditions may require. In the description of my process, I refer to one container and the operation of its component parts, as this will be sufficient to cover the other two illustrated compartments, it being understood that a batch of material is put into each compartment and the process of treating these batches started at various times to insure the completing of the process for the several batches at different times, so that the resulting produced batches will be ready for the succeeding feedings for each day.

The casing is preferably formed of wood and comprises a front wall $1^a$, a bottom $1^b$, a rear wall $1^c$, and transverse walls 9 which form the end walls for the outer compartments and partitions between them and the intermediate compartment 1. Each front wall 1ᵃ is swingable independently of the other front wall on suitable hinge devices 1ᵃ′ disposed between its lower edge and the bottom 1ᵇ; and each front wall 1ᵃ comprises a plurality of hinged together sections, which permit one or more thereof to be folded laterally to admit a greater or lesser amount of air into the compartment 1. Between the compartments I prefer to provide pairs of walls 9 so that provision may be made to insulate adjoining compartments, as shown at 9ᵃ.

2 indicates a cover for each compartment 1, hinged at 2ᵃ along its rear edge. 3 indicates a piston having an area substantially equal to the area of the compartment, so that it engages with and compresses all of the material in the compartment when moved downwardly. The piston 3 has connected to it the lower end of a screw 6, the threads of which engage a nut 5 fitted in an opening 4 formed in the cover 2. The nut 5 may be fixed in the opening 4 in any desired manner so that when the screw 6 is rotated, the nut will effect endwise movement of the screw and thus move the piston 3 accordingly. At its upper end, the screw is provided with a crank or handle 7, whereby it may be rotated. 8 indicates a suitable lining for the interior walls of each compartment. The lining 8 is formed from a material which will not be attacked by any of the ingredients used in conection with the treatment of the food products herein referred to.

10 indicates devices for securing the cover 2 in closed position. The devices herein shown comprise screws 10ᵃ and bifurcated elements 10ᵇ the latter being preferably carried by the cover and the other carried by the front walls, and thumb nuts 10ᶜ arranged to be tightened on the screw into engagement with the bifurcated elements. These securing devices may be used to hold the front wall in position, but as it is desirable to hold the front wall in position, when the cover 2 is opened, for example, during filling of the compartment, I provide separate securing devices 11. The devices 11 preferably comprise resilient strips secured at their inner ends to the upper edges of the partitions 9 and carry at their outer ends lugs 11ᵃ behind which the front wall fits. The front faces of the lugs 11ᵃ are inclined so that when the front wall is swung to its closed position, the lugs 11ᵃ will ride over the end of the wall 1ᵃ and engage its outer surface. As will be understood from Fig. 4, the hinges for the sections constituting each front wall permit them to swing or fold outwardly; accordingly when the upper section is secured by the securing devices 10 or 11, the wall 1ᵃ will be held in closed position.

The connection between the lower or free end of each screw 6 and the adjacent piston 3 is detachable; in fact, I prefer to provide each piston with a thrust plate 12 having a socket into which the screw fits. In a construction of this character, each cover 2 may be readily raised and the piston may be removed from the adjacent compartment.

From the foregoing description it will be seen that I have provided a construction which is relatively simple and readily adaptable to carrying out the process set forth in my aforesaid original application. By making the front wall of sectional form, the exposure of the materials can be regulated, by folding one or more sections outwardly. As the sections of the front wall are foldable independently of the position of the cover 2, the exposure can be regulated while the piston 3 is in position. By opening the cover 2 and removing the piston, the upper surface is exposed to air; while the opening of the front wall 1ᵃ exposes the side of the materials to air.

The compartments 1 are filled to any desired height with the predetermined proportions of food materials, water and converter; then the piston 3 is positioned, the cover closed and the crank operated to effect the desired amount of pressure upon the materials. When the converter has caused sufficient re-action, the compartment is opened to the desired extent.

It will also be understood, that the sectional form of the front wall permits ready access to the treated material when it is to be removed and enables the operative to readily remove a predetermined quantity from the upper surface of the batch downwardly, if desired.

To those skilled in the art to which my invention relates many changes in construction and widely differing embodiments and applications of my invention will suggest themselves without departing from the spirit and scope thereof. My disclosures and the description herein are purely illustrative and are not intended to be in any sense limiting.

What I claim is:

1. An apparatus for use in converting food materials comprising a container having an opening through which materials are admitted and a removable section to admit air, a piston arranged to engage the materials delivered therein, and means for moving said piston in one direction relative to the materials independently of the position of the removable section.

2. An apparatus for use in converting food materials comprising a container open at its top, a front wall comprising a plurality of sections hinged together, means to attach the sections in closed relation to the container, a piston, a cover for the container, and means carried by the cover to depress the piston.

3. An apparatus for use in converting food materials comprising a container open at its top, a front wall comprising a plurality of horizontally hinged sections, means to attach the sections in closed relation to the container, a piston, a cover for the container, and means carried by the container to depress the piston.

In testimony whereof, I have hereunto subscribed my name.

ALFRED M. KLEIN.